(12) United States Patent
Leong

(10) Patent No.: US 6,434,552 B1
(45) Date of Patent: Aug. 13, 2002

(54) METHOD FOR DATA RETRIEVAL

(75) Inventor: Jin Fye Leong, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/311,172

(22) Filed: May 13, 1999

(30) Foreign Application Priority Data

Jan. 29, 1999 (SG) ............................................. 9900269

(51) Int. Cl.$^7$ ............................. G06F 17/30; G06F 7/00
(52) U.S. Cl. ............................................... 707/4; 704/9
(58) Field of Search ............................. 704/9; 707/3–6

(56) References Cited

U.S. PATENT DOCUMENTS

| | | | | |
|---|---|---|---|---|
| 5,535,382 A | * | 7/1996 | Ogawa | 395/600 |
| 5,606,712 A | | 2/1997 | Shinji | 395/800 |
| 5,867,822 A | * | 2/1999 | Sankar | 705/8 |
| 5,873,076 A | * | 2/1999 | Barr et al. | 707/3 |
| 6,016,478 A | * | 1/2000 | Zhang et al. | 705/9 |
| 6,167,397 A | * | 12/2000 | Jacobson et al. | 707/5 |

FOREIGN PATENT DOCUMENTS

| | | | | |
|---|---|---|---|---|
| EP | 0461400 | | 12/1991 | ........... G06F/17/22 |
| WO | WO 98/37478 | | 8/1998 | ........... G06F/17/00 |

OTHER PUBLICATIONS

Varhof P: "Windows CE ushers in handheld PCs" Computer Design, Pennwell Publ. Littleton, Massachusetts, US, vol. 36, No. 2, Feb. 1, 1997, pp. 18, 20, 22 XP000722600.

* cited by examiner

*Primary Examiner*—John Breene
*Assistant Examiner*—Susan Rayyan

(57) ABSTRACT

A method for retrieving data with a more intuitive manner of specifying search conditions is disclosed. The method is implemented as an application on a computing device. The method is suitable for retrieving information stored as records in the computing device in a search operation. Records are retrieved if they meet a set of search conditions. The search conditions comprise a search text and other conditions. The application accepts a search command which contains the search text and any other search conditions. This search command consists of words entered in a free-form manner. Words which match predetermined keywords are translated into search conditions using information related to the predetermined keywords. Non-matching words form the search text. In a search operation, the application communicates with a user through a set of screens which are bidirectionally linked to one another. Each new set of screens for a new search operation is bidirectionally linked to a set of screens for a preceding search operation. This bidirectional linking of screens allows a user to move from one screen to another within and outside of a search operation.

1 Claim, 6 Drawing Sheets

METHOD FOR DATA RETRIEVAL

FIELD OF INVENTION

This invention relates to a method for data retrieval in a computing device and more particularly to an intuitive method for retrieving personal management information stored in a handheld personal computer (H/PC) or the like. The invention also relates to a method for linking screens associated with the retrieval of data.

BACKGROUND

Electronic organizers such as personal digital assistants (PDA's) and handheld personal computers (H/PC) have become increasingly popular for personal information management (PIM). Examples of such personal information include information of business contacts, appointments and tasks. These information are usually maintained in separate databases in a H/PC. An example of a H/PC is one running the WindowsCE operating system (OS) available from Microsoft, Redmond, Wash., USA. Each of the databases in the H/PC running WindowsCE is written to and read from through applications such as Contacts, Tasks and Calendar.

There are two aspects in the usage of such an electronic organizer: the entry and the retrieval of data. Since such organizers are used by mobile users, these users would prefer both the entry and retrieval of data to be as hassle-free as possible. Currently there are two methods for retrieving data in an electronic organizer such as a H/PC running WindowsCE. One of the methods is implemented in a "Find" tool, which is available in the Contacts, Tasks and Calendar applications. The activation of the "Find" tool causes a search conditions definition GUI window to appear on a display of the H/PC. To formulate the search conditions, a user needs to specify a search text for searching, which database or databases to search, and a start and an end date if the search is to be limited to a particular period.

The second method is a global search application which is able to search for any information that resides on the H/PC. One such application software is a bFIND application available from bSquare Development, Washington, U.S.A. This bFind application is separate from the Contacts, Tasks or Calendar applications. Unlike the "Find" tool, this bFind application is able to search more than just personal management information. The bFind application is able to search file contents, search for file names and other information matching a search text. However, the method for specifying search conditions is similar to that of the "Find" tool. A user is expected to enter several pieces of information to formulate the search conditions. For example, the user is required to enter a search text for searching, databases to carry out the search in and if files are involved, where and what type of files to search.

These two methods suffer from disadvantages. The two methods described above necessitate several manual steps for the definition of search conditions. First a user has to decide what information to retrieve. Having decided the information, the user has to decide a search text which is contained in the information. As example, the user has information stored in the H/PC of a person by the name of John Smith. In deciding the search text for searching, the user is burdened by having to decide whether "John Smith" or "Smith John" should be the search text. The user may even contemplate having a single-word search text consisting of either the name "John" or "Smith". Next, the user has to specify the database or location to search for the information. The user has to decide where the original information is stored. For example, the user has to decide if the information is stored in the Contacts, Tasks, Calendar databases or in a particular file. If the information is stored in a file, the user may want to further specify a particular type of file to search. The user may additionally want to restrict the search to one in a particular period of time. For example, the information containing the name "John Smith" may well be stored in an Appointment record. Such a record may be more accurately and quickly retrieved if a search is limited to a particular period.

One is quickly drawn to the fact that as the user formulates the search conditions in the mind, the user has to also assimilate the search fields and try to break the search conditions up to fit the different fields as presented in a search-conditions-definition GUI screen. This mapping of formulated search conditions in the mind into the different fields in the search GUI slows the definition of the search conditions on the H/PC. This restrictive manner in which an application requires a user to enter a search conditions is unintuitive and impedes the process of definition of the search conditions. The method requires a user to be very knowledgeable of each search field in the GUI screen in order to be able to use them effectively. Using search fields to define the search conditions is definitely a disadvantage where speed is concerned.

The speed with which search conditions can be specified is limited by the fact that a similar application is named differently on organizers of different make. For example, a contact application in one organizer is known as a phone application in another organizer. Similarly, a calendar application in one organizer is known as an appointment application on another. The task of having to decide which database to search for a user who owns two such organizers limits the efficiency of searching. The task is also inconvenient and annoying.

The need to know the date format of an organizer which allows free form entry of date affects both the speed as well as the accuracy of search conditions specification involving dates. For example, when entering a date, one has to know whether the 1st of July 1998 is Jan. 7, 1998 or Jul. 1, 1998. As another example, all that are familiar with April Fool's day knows that day is synonymous with 1st April. A user should not have to concern whether April Fool's day should be specified as Jan. 4, 1998 or Apr. 1, 1998 on any particular organizer. Some organizers overcome the day and month ambiguity by allowing date selection to be made through a displayed GUI calendar. However, such a calendar display is cumbersome to manipulate, especially when the date of interest is months away from an initially displayed default date.

Another disadvantage of the two search methods is that once a new search is carried out, records of previous searches are lost. To search for a search text previously searched for, a user will have to repeat the search.

The foregoing therefore creates the need for an application software or a software function within an application software which a user can independently launch or invoke to allow the user to quickly define a set of search conditions as formed in the user's mind. Once the information is entered, the user simply activates the search and leaves the proper formulation of the search conditions to the application or software function. The application or software function should also maintain previously retrieved data so that search for these data need not be repeated.

SUMMARY

In one aspect the invention provides a method for retrieving data with a more intuitive manner of specifying search conditions. According to the preferred embodiment of the invention, the method is implemented as an application on a computing device. The method is suitable for retrieving information which is stored as records in the computing device. Records are retrieved if they meet the specified search conditions. A search condition comprises a search text and other search conditions. In a search operation, the application accepts a search command which contains the search text and other search conditions. The application then breaks the search command into words. The application translates any word which matches any predetermined keywords into an appropriate search condition. Words which do not match any predetermined keywords form the search text. Records which bear the search text and meet the search conditions are then retrieved.

In another aspect the invention provides a method for managing screens associated with a plurality of search operations. Each search operation comprises a set of at least two screens which are bidirectionally linked to each other. These screens are for a user to interface with the computing device during a search operation. Each new set of screens for a new search operation is also bidirectionally linked to a set of screens for a preceding search operation. This bidirectional linking of screens allows a user to move from one screen to another within and outside of a search operation.

BRIEF DESCRIPTION OF DRAWINGS

The invention will be better understood with reference to the drawings, in which.

DETAILED DESCRIPTION OF THE PREFERRED EMBODIMENTS

Figure 1:
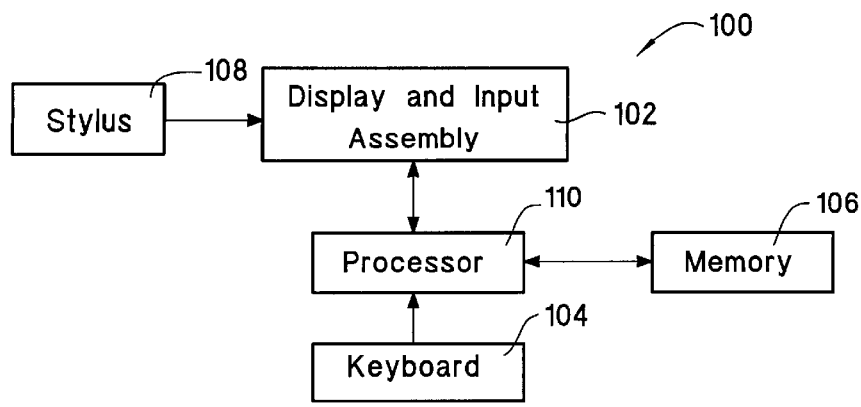
FIG. 1 is a prior art block diagram of a computing device.

A search application embodying the invention is described as an application residing on a computing device such as a handheld personal computer (H/PC). FIG. 1 is a block diagram of major components of a typical pen-based H/PC 100. The H/PC 100 comprises a display and input assembly 102, a QWERTY keyboard 104, a memory 106, a pen or stylus 108 and a processor 110. An operating system (OS) which manages the operations within the H/PC 100 resides in the memory 106. The display and input assembly 102 is both an input and an output device. When acting as an output device, the assembly receives data from the processor 110 and displays that data on a suitable display screen. The display screen is preferably a liquid crystal display (LCD). The input device of the display assembly 102 is preferably a thin, clear membrane which covers the LCD display and which is sensitive to the position of the stylus 108 on its surface. With such a structure, the membrane of the display assembly 102 serves as an input tablet.

The search application is implemented as a series of program instructions that resides in a program storage device, such as the memory 106 of the H/PC 100. The instructions are collectively known as an application program or simply a program. There are several methods of launching a search application. One of the methods is to have a search application icon appear on the display assembly 102 to provide a means for launching the search application. To launch the application using such a method, a user activates the search application icon with the stylus 108. This action causes a control circuit of the display assembly 102 to send a launch search application signal to the processor 110. The processor 110 on detecting the signal causes the OS to run the search application program. Other methods of launching the application will be described later.

Figure 2:
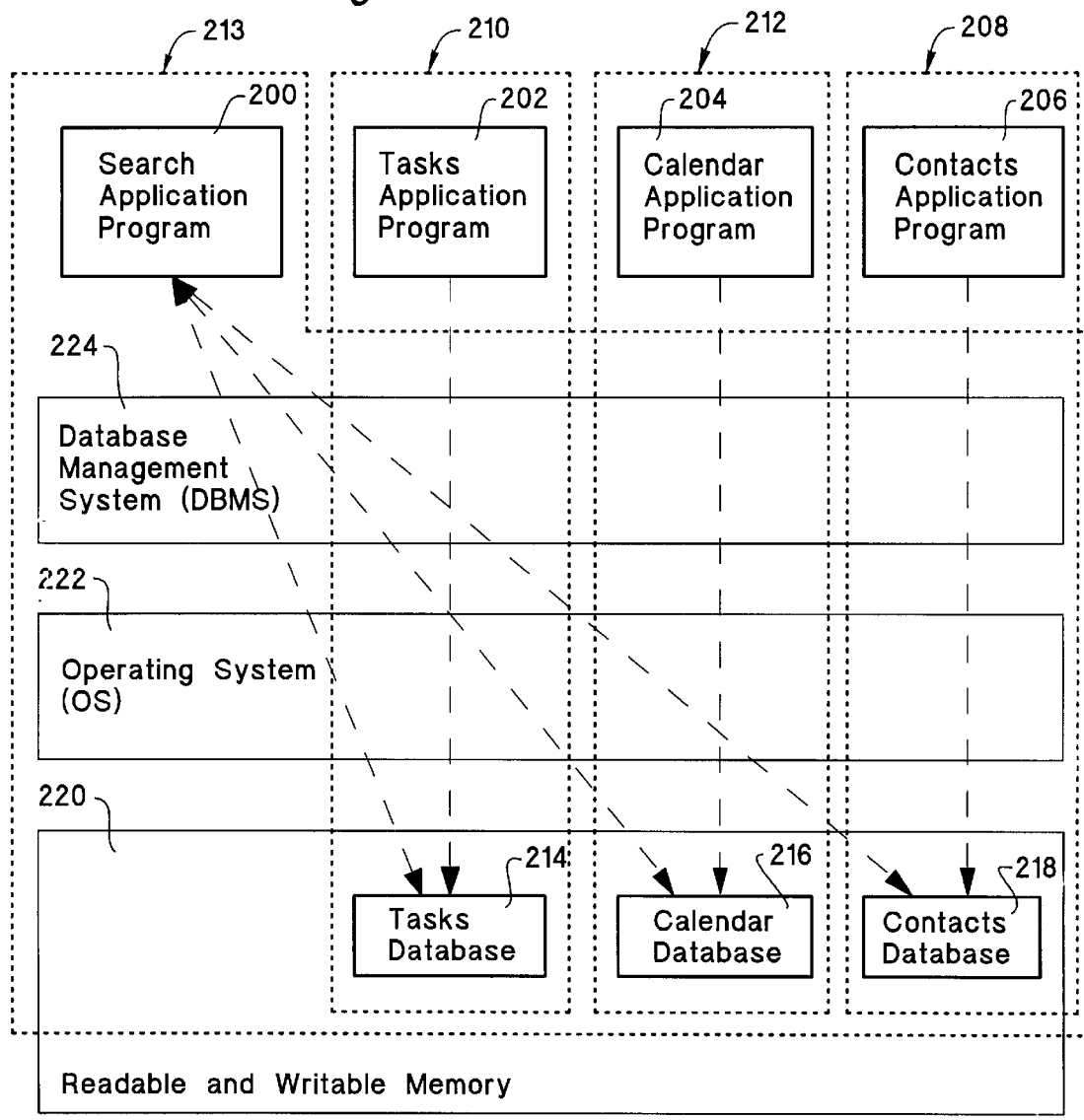
FIG. 2 is a block diagram of software residing in a memory of the computing device in FIG. 1. One of the software is a search application software which uses the data retrieving method in accordance with the present invention.

FIG. 2 is a block diagram showing some software that resides in the memory 106 of FIG. 1. The memory 106 besides containing the search application program 200 also contains other programs 202, 204, 206, which provide other applications 208, 210, 212 which are separate from the search application 213. Examples of such existing applications on a H/PC 100 are a contacts application 208, a tasks application 210 and a calendar application 212. The user activates the contacts application 208 to store and search for personal information such as names, addresses and telephone numbers of friends and business contacts. The tasks application 210 is used to maintain a list of outstanding to-dos. The tasks application 210 holds information such as task description, due date and others. The user activates the calendar application 212 to maintain a list of appointments, each of which logs information such as appointment description, date, time and venue.

The applications 208, 210 and 212 maintain their respective information in data stores such as files (not shown) or databases 214, 216 and 218 that reside in a readable and writable portion 220 of the memory 106. Each related group of data, for example, a name, an address and a telephone number, is stored in a database as a record. The individual pieces of information in the record, that is, the name, address and telephone number are known as fields. A database contains many instances of each record type. It is important to distinguish between a type and an instance of both a record and a field. For example, an instance of a contacts record type in the contacts database 218 consists of an instance of each of the following field types: name, address, telephone number and email address. As a further example, the name "John Smith" is an instance of the name field type. It is a common practice to drop the qualifiers "type" and "instance" (for both records and fields), and to rely on context to indicate which of the two is meant. The description that follows adopts this common practice.

To access the databases 214, 216, 218, the applications 210, 212, 213, 208 use services provided by a separate layer of software commonly known as a database management system (DBMS) 224. The DBMS 224 in turn uses services provided by an OS 222 to read and write to the databases 214, 216, 218. The DBMS 224 offers facilities such as facilities for creating databases, inserting data to and retrieving data from the databases 214, 216 and 218 and other facilities as is known to those skilled in the art.

Figure 3:
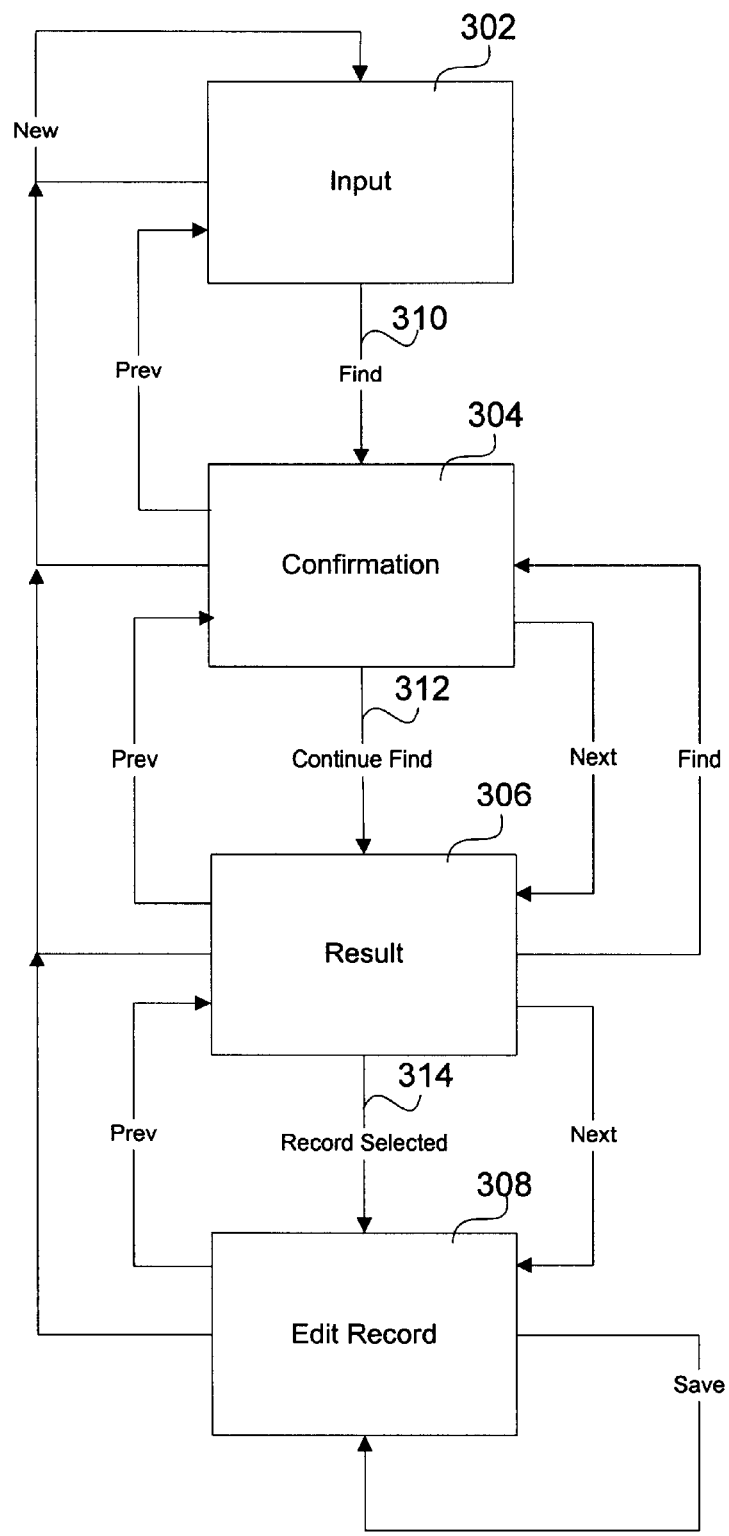
FIG. 3 is a state transition diagram illustrating possible changes in states in a search operation following a particular sequence.
Figure 4:
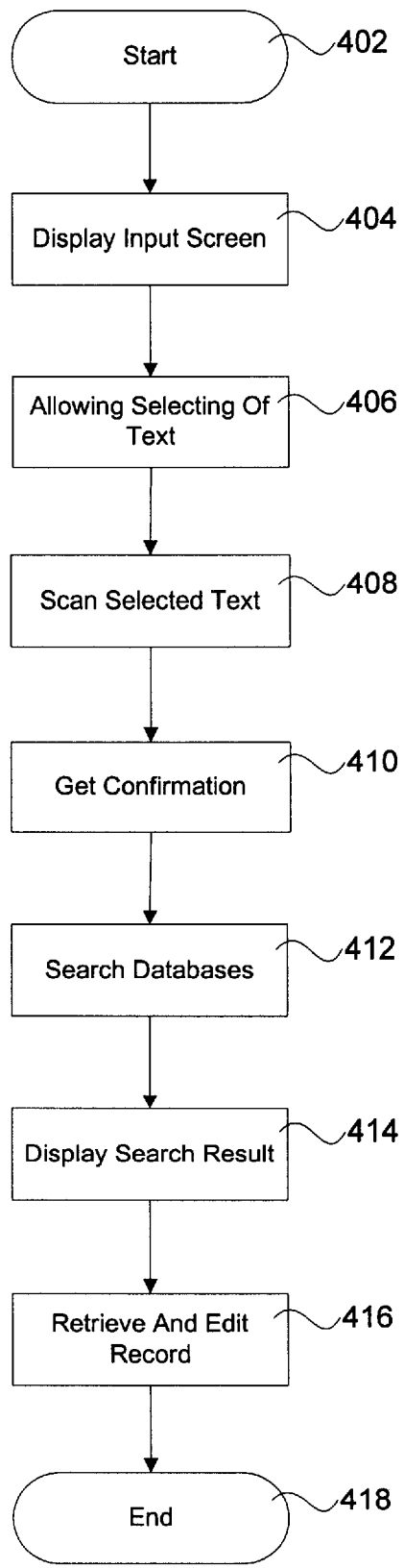
FIG. 4 is a flowchart illustrating the method of data retrieval in the operation sequence of FIG. 3.

The operation sequence of the search application 213 embodying the invention is now explained with reference to FIGS. 3 and 4. FIG. 3 is a state transition diagram showing various states 302, 304, 306, 308 of a search operation. The allowable transitions between the states are also shown. A state machine implemented in the application manages the state changes. The states are named INPUT 302, CONFIRMATION 304, RESULT 306 and EDIT RECORD 308 according to screen types which are displayed in each of the states. The operation sequence transitions from one state to another when the state machine receives an impetus. This impetus is the result of a user activating one of several buttons on the different screens. FIG. 4 is a flowchart showing a sequence of steps embodying the method of data retrieval.

Figure 5:
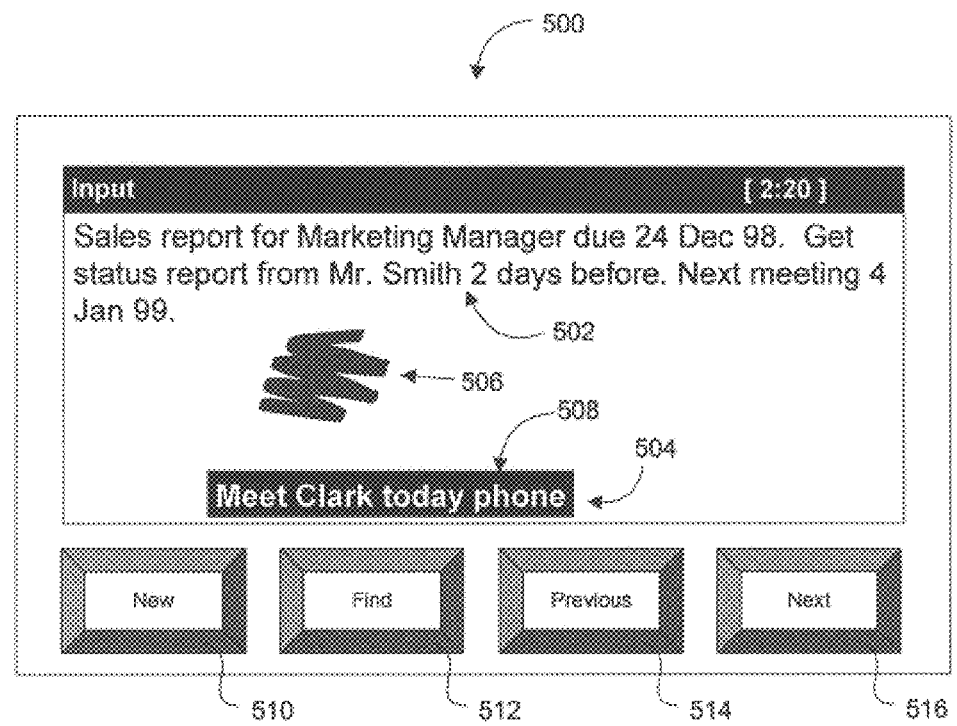
FIG. 5 is an example of an Input GUI screen used in the search application of FIG. 2 which allows a user to specify a selected text for processing by the search application.

When the search application 213 is launched, for example using the icon method described above, the sequence starts in a START step 402 and proceeds to a DISPLAY INPUT SCREEN step 404. In this step 404, the application 213 displays an Input GUI screen 500 as shown in FIG. 5. This Input GUI screen 500 allows a user to enter notes 502, 504 and graphics 506. The user enters notes 502, 504 using the keyboard 104 and graphics 506 using the stylus 108.

The sequence next proceeds to an ALLOW SELECTING OF TEXT step 404. In this step 404, the application allows the user to select part of the notes 502, 504 as a selected text or search command 508 for processing. The user can specify the selected text 508 by highlighting any portions of the notes 502, 504 with the stylus 108. FIG. 5 shows notes 504 as the only portion of the notes 502, 504 selected as the selected text 508.

After text 508 is selected, the application waits for a command from the user. The user can select a command by clicking on the appropriate buttons 510, 512, 514, 516. These commands are for the generation of a new Input GUI screen, the invoking of a search operation on the selected text 508, and the traversing of screens. Each of these commands will be described later. The DISPLAY INPUT SCREEN and ALLOWING SELECTING OF TEXT steps 404, 406 may be considered as belonging to the INPUT state 302 of the state transition diagram in FIG. 3.

If the user selects the Find button 512 on the Input GUI screen 500 when selected text 508 is available, the operation follows the path of an arrow 310 in FIG. 3 to enter a CONFIRMATION state 304. The sequence in FIG. 4 also proceeds to a SCAN SELECTED TEXT step 408, where the application separates characters of the selected text or search command 508 into groups that logically belong together. For the preferred embodiment, the application recognizes the space character as a delimiter between the groups. These groups of characters will be simply called words in this description. Before proceeding to describe how these words in the selected text 508 are translated into a set of search conditions, a table which is used for translating a selected text is first described.

TABLE 1

Translation Table

| Keyword | Search Field | Databases |
| --- | --- | --- |
| today | From: = system date<br>To: = system date | Task, Calendar |
| tomorrow | From: = system date + 1 day<br>To: = system date + 1 day | Task, Calendar |
| fax | | Contact |
| email | | Contact |
| phone | | Contact |
| meet | | Task, Calendar |
| April Fool's day | From: = 1 Apr + year in system date<br>To: = 1 Apr + year in system date | Task, Calendar |

Table 1 is a translation table used for translating words in the selected text 508. Each row in the table is a separate record. Each record has three fields. The first field is a keyword field. Each keyword uniquely identifies a record in Table 1. The words in a selected text, such as the selected text 508, are checked against the keywords in Table 1 to see if there is a match. If any keyword appears in the selected text, the information contained in the particular record in the table identified by the keyword will be used to develop one or more search conditions. The second field of each record contains rules which govern how the search conditions are formed. The third field identifies which of the many different databases should be searched. This information forms yet another search condition.

The method of translating selected text 508 into search conditions using the translation table is best illustrated with an example. Take the case of a selected text consisting of a sentence "Meet Clark today phone" as shown in FIG. 5. When the Find button 512 is selected, the application scans the selected text 508 character by character until a delimiting space character is encountered. When the first space character is reached, the application recognizes "Meet" as a word. On the second space character, the application picks up the second word "Clark". Using such a method, the sentence "Meet Clark today phone" will be broken into four separate words, "Meet", "Clark", "today" and "phone". The application finds the word "Meet" in the translation table and recognizes it as a keyword. The application then attempts to use information in the matched record containing the keyword "meet" to develop one or more search conditions. However the second field of the record is empty. There are no rules in this particular record to govern how any search condition should be developed. The application proceeds to check the third field containing information of databases to search. Based on the information in this third field, the application selects the Calendar and Tasks databases accordingly for searching.

The application next checks for a match for the word "Clark" in the keyword column of the translation table. Since "Clark" is not found in the translation table, the application classifies it as not a defined keyword but as part of a search text. Words in the search text will be searched for in the selected databases after the entire selected text 508 is scanned.

The application next processes the next word "today" by checking for a keyword "today" in the translation table. The application finds another record with a keyword "today". And according to the rules in the second field of the record, the application fills the From and To dates search conditions with a system date maintained in the H/PC. If the system date is kept up to date, the application will be able to pick up the correct date to enter into the appropriate fields of the search conditions.

Finally the application, in processing the last word "phone" in the selected text 508, searches the translation table for a record containing the keyword "phone". Once again, the application finds that such a record exist and uses the information to further develop the search conditions. This record simply indicates that the Contacts database be searched. Based on this information, the application simply marks the Contacts database for searching.

Figure 6:
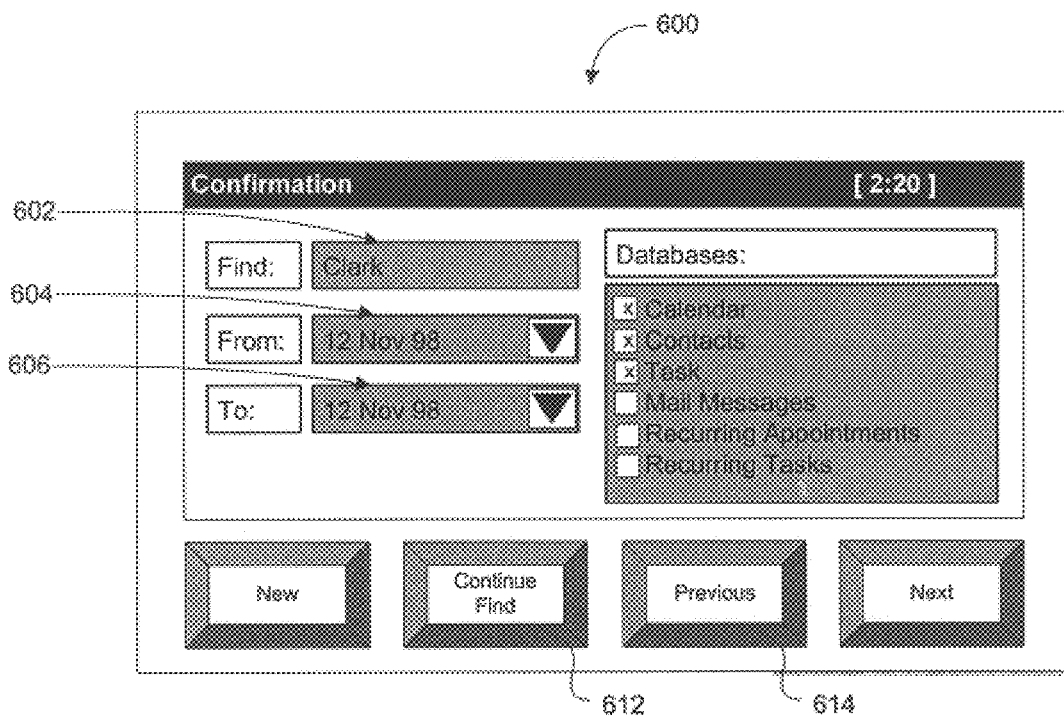
FIG. 6 is an example of a Confirmation GUI screen which seeks confirmation from the user regarding the formulation of a set of search conditions after the application has processed the selected text of FIG. 5.

When the application has scanned all words in the selected text, the sequence proceeds to a GET CONFIRMATION step 410. In this step, the application presents the results of the translation of the selected text 508 in a Confirmation GUI screen 600. An example of such a confirmation GUI screen 600 is shown in FIG. 6. This Confirmation GUI screen 600 shows the search conditions after the selected text 508 has undergone translation in the SCAN SELECTED TEXT step 408. The Confirmation GUI screen shows a search text 602 consisting of a single word "Clark" and From and To date fields 604, 606 containing a date, Nov. 12, 1998, assuming that Nov. 12, 1998 is the date the search is invoked. It also shows the Calendar, Contacts and Tasks databases marked for searching. At this point, the application waits for confirmation from the user to commence searching. The user may either accept the search conditions as developed by the application or the user may modify the different fields in the search conditions. When the user is satisfied with the search conditions, he or she may click on a Continue Find button 612 to allow the sequence to proceed to a next step. The user may alternatively select a Previous button 614 to discontinue the search operation. In the latter case, the application redisplays the previous Input GUI screen 500 as shown in FIG. 5 to allow the user to enter or select new text for searching.

If the Continue Find button 612 is activated, the operation follows the path of an arrow 312 in FIG. 3 to a RESULT state 306. The sequence also proceeds to a SEARCH DATABASES step 412. In this step, the application searches each of the marked databases in the Confirmation GUI screen 600 for records meeting the other search conditions. In a database such as the Contacts database, a record is deemed to meet the other search conditions if it contains the search text. Such a record does not contain any time information and the date conditions are therefore of no relevance when retrieving records in that database. However in another database such as the Calendar database, a record is deemed to have met the other search conditions if it contains the search text and has a date which falls between the From and To dates of the search conditions.

If the search text consists of more than one word, the application can either search for records in the databases containing the entire search text or the application can simply search for records containing one or more words in the search text separately. The latter method of searching takes longer to complete as it consists effectively of a larger number of searches. The search text may additionally include BOOLEAN operators, such as but not limited to, AND and OR operators to further qualify the search text.

The sequence next proceeds to a DISPLAY RESULT step 414, where the application displays results of the search operation. The application uses a primary and a secondary sort order to display the results of the search operation. For example, a primary sort order may indicate that records of a similar type be displayed in an ascending order with the record type having the least number of matched records being displayed first. The secondary search order determines how records of each record type are displayed. For example, in the displaying of contacts type of records, the records are sorted in an ascending order according to the Name field in the contacts records. Examples of sorting orders for other record types are given in Table 2 below.

TABLE 2

Secondary Search Order

| Record Types | Secondary Search Order |
| --- | --- |
| Contacts | Ascending ASCII on the Name field |
| Tasks | Most recent first on the Due-date field |
| Appointments | Most recent first on the Date and Time fields. For repeating appointments, only current and future appointments will be displayed. |

Figure 7:
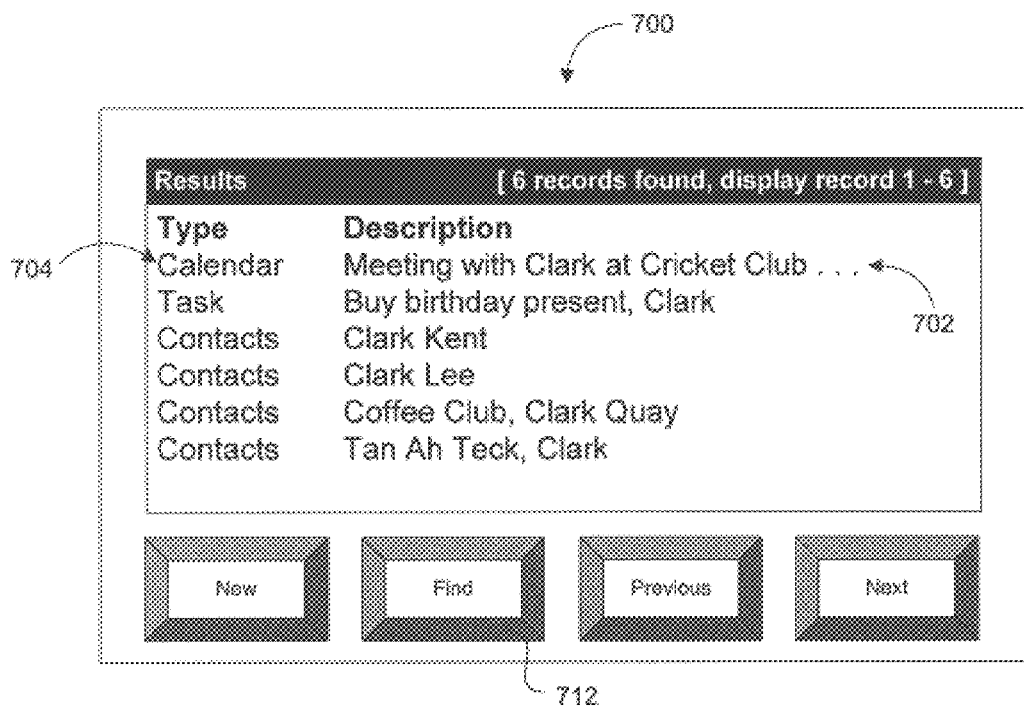
FIG. 7 is an example of a Result GUI screen showing retrieved records meeting the search conditions in FIG. 6.

FIG. 7 is an example of a Result GUI screen 700 showing records containing the search text "Clark". The application, in addition to displaying truncated text 702 of matched records, also displays the type 704 of each record as shown in FIG. 7. If there are more records than can be accommodated in one Result GUI screen 700, the activation of the Find button 712 will reveal a next screen of records meeting the search conditions.

In this RESULT state 306, a user may specify a new search by selecting a portion of text displayed on the Result GUI screen 700 and activating the Find button 712. The application will treat the search as if a search is activated from an Input GUI screen.

Figure 8:
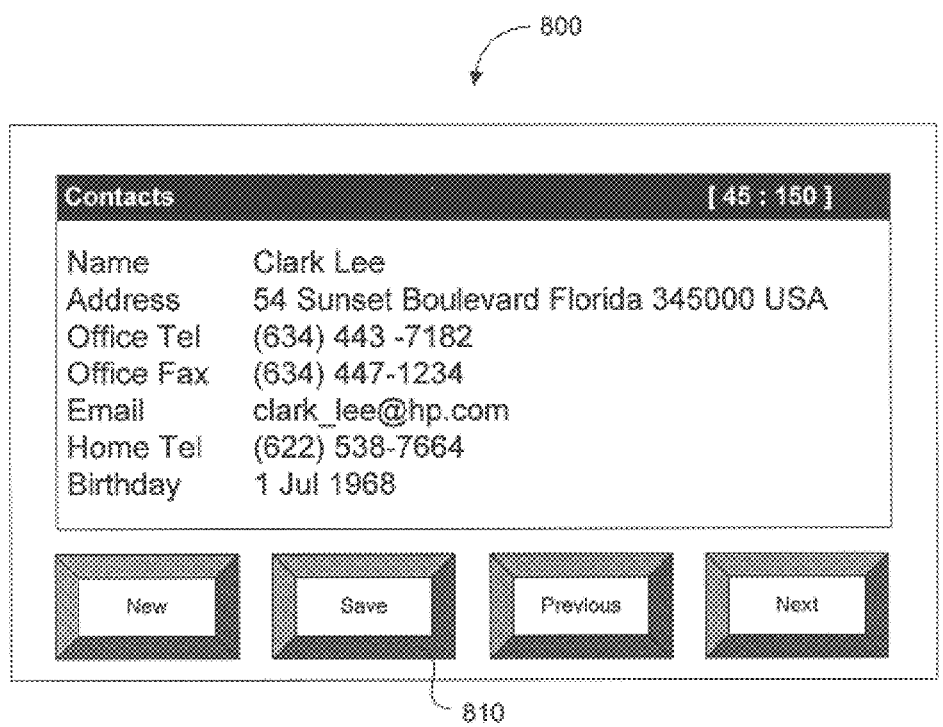
FIG. 8 is an example of an Edit Record GUI screen showing various fields of a record, which is selected from the retrieved records of FIG. 7 for updating.

After the results of a search is available, the user can view or modify a record by selecting the record, for example by tapping the stylus twice on the display 102 where the record is displayed. The action of selecting a particular record in the Result GUI screen 700 causes the search operation to follow the path of an arrow 314 in FIG. 3 to enter an Edit Record state 308. The sequence also proceeds to a Retrieve And Edit Record step 416. In this step 416, the application displays an Edit Record GUI screen 800. FIG. 8 is an example of an Edit Record GUI screen 800 showing fields of a "Clark Lee" contacts record. The screen 800 allows a user to access all the fields of the particular record. One way to allow access to the record is for the search application 213 to be given read and write permissions to the databases so that a user can access the databases using the search application directly. Another way is for the search application to invoke the appropriate application and for the user to use the appropriate application to subsequently access the databases.

After making appropriate changes to the record on the Edit Record GUI screen, the user activates the Save button 810 to save the modifications into the respective database. At this point, the sequence terminates in an End step 418. The search operation following a particular sequence of operation has now been described. The effects of activating some of the other buttons in each of the GUI screens 500, 600, 700, 800 which were not previously discussed, will now be described.

The purpose of the Previous and Next buttons is described first. When progressing from one screen type to another, for example from the Input GUI screen 500 to the Confirmation GUI screen 600, the application links the two screens bidirectionally. This linking of the two screens allows the user to switch from one screen to another by activating the Previous, Next or Find buttons depending on the screen type. For example, to get to the Input GUI screen 500 from the Confirmation GUI screen 600, the user needs to activate the Previous button. And to move in the reverse direction, the user needs to activate the Find button. However for other screen types, such as from the Confirmation GUI screen 600 to the Result GUI screen 700 and from the Result GUI screen 700 to the Edit Record GUI screen 800, the Next button is activated in each case to move in the specified direction. FIG. 3 shows the specific buttons which need to be activated to move from one screen type to another for the different states.

Figure 9A:
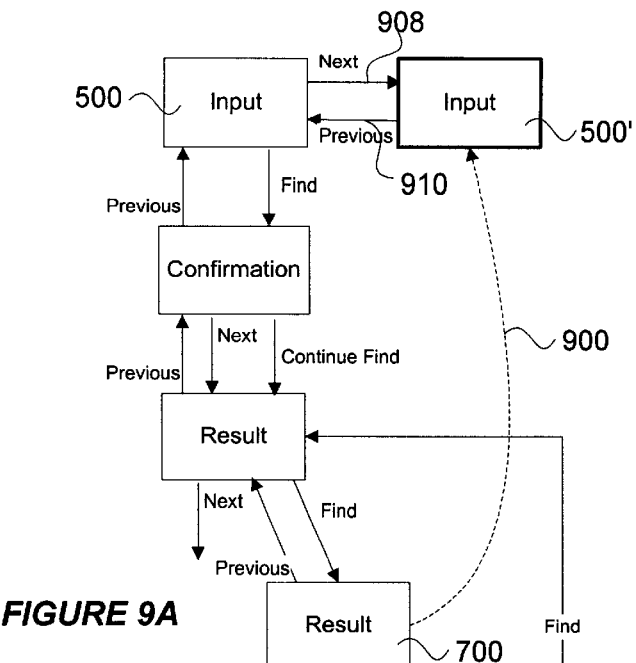
FIGS. 9A, 9B and 9C are state transition diagrams showing how a newly invoked Input GUI screen may be linked to existing screens of a search operation.

Next the purpose of the New Button in the screens is described. When the New Button is activated, a new Input GUI screen is created for initiating a new search operation. There are many possibilities in linking such an Input GUI screen to screens of a preceding search operation. Consider the case when a new Input GUI screen is invoked from within a search sequence as previously described. Assume such a search operation returns more records than can be accommodated in a single Result GUI screen 700. FIG. 9A is a state transition diagram showing state transitions during this particular sequence. The invocation of a new Input GUI screen from one of the several RESULT states is also shown. A dotted-line arrow 900 shows that the new Input GUI screen 500' is invoked from a Result GUI screen 700. One method of linking the new Input GUI screen 500' is for the application to back up to the first Input GUI screen 500 by following the Previous link from each screen to a preceding screen until the Input GUI screen 500 is reached. The application after creating a second Input GUI screen 500' bidirectionally links the screen 500' to the first Input GUI screen 500 through a Next link 908 and a Previous link 910. The Next link 908 originates from the first Input GUI screen 500 to terminate at the second Input GUI screen 500' and vice versa for the Previous link 910. When screens are linked bidirectionally in this manner, a user can move between the two screens by activating the appropriate Next and Previous buttons in the Input GUI screens 500, 500'.

Figure 9B:
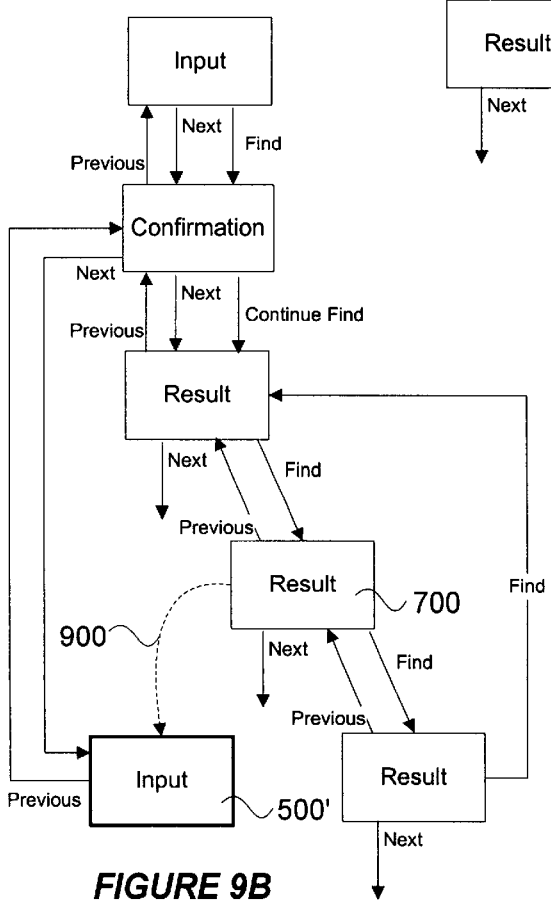
Figure 9C:
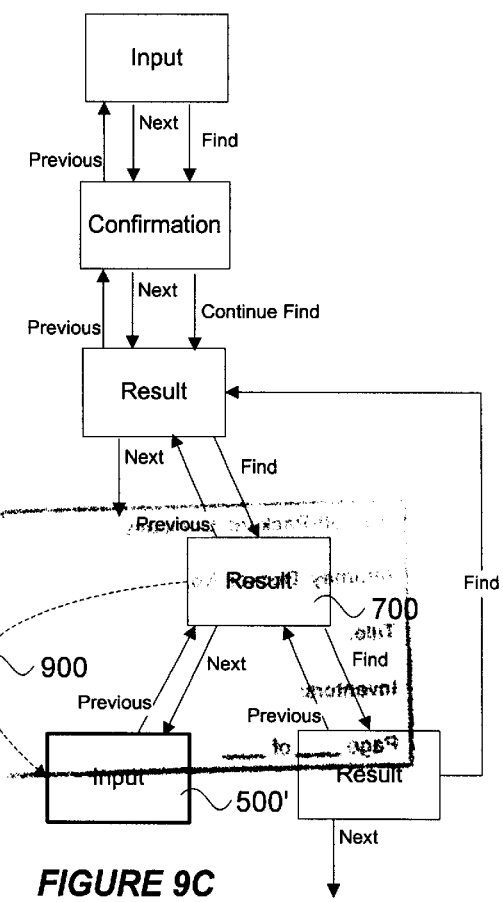

FIGS. 9B and 9C are other implementations of linking a new Input GUI screen 500'. These implementations are not as elegant as that shown in FIG. 9A. The implementations in FIGS. 9B and 9C may become unwieldy after several invocations of new Input GUI screens at different states of searches.

The application can support as many new Input GUI screens as the amount of memory 106 on the H/PC can support. Each screen can be exited by appropriate activation of a exit or quit button on each screen (not shown) to free up memory used for supporting the screen. The quitting of screen may cause downstream screens to be also quitted, as it may no longer make sense to maintain those screens since the link to them from a higher level screen has been broken. This quitting of screens will further free up memory. When invoking a new Input GUI screen when there is insufficient memory on the H/PC to support the invocation, the oldest screen will be discarded. In an implementation such as that in FIG. 9A, the oldest Input GUI screen 500 and its associated downstream screens will be purged to free memory for a new Input GUI screen invocation. Other variations of such a method are applicable to the implementations in FIGS. 9B and 9C.

On each of the screens described, an Update button (not shown) is also available. Activation of this button allows a user to update the translation table of Table 1. During updating, the application displays the Translation table and allows the user to update the table by modifying, deleting and adding new records.

While the present invention has been shown and described with reference to the foregoing operational principles and preferred embodiment, it will be apparent to those skilled in the art that other changes in form and detail may be made.

For example, in the above disclosure, the keyboard 104 is described as a means to enter data for searching. It will be expressly understood by those skilled in the art that a handwriting recognition or voice recognition means is equally applicable for entering data. Also, instead of having a contiguous block of selected text, the selected text may consist of separate blocks of text.

As a further example, the search application need not be separate and independent of the other applications but integrally implemented with the applications. The implementation may be in the form of a software function within the applications. This will allow a user to search other types of information when using any one of the applications. For example, when using a calendar application, a user may invoke a search function within the calendar application to search contact information. It is also possible to have such a search function in a word processing application like Microsoft Word, available from Microsoft Corporation (Redmond, Wash., USA).

As yet a further example, the DBMS 224 may be replaced by a simple set of file manipulation routines and databases 214, 216 and 218 may be implemented as other data stores such as simple files which the file manipulation routines can operate on.

Also the above disclosure is described in terms of personal management information using the Calendar, Tasks and Contacts applications. The invention should not be construed to be limited to only being able to search personal management information. A user will be able to adapt the invention to a different application, for example, an application involving a car parts database where information regarding suppliers, parts and stock availability are maintained.

The keywords and translation rules in the translation table given in the above disclosure are meant only for illustration purposes. The disclosed keywords and rules in Table 2 are chosen for only a simple illustration to aid the understanding of the SCAN SELECTED TEXT step 408 and may not suffice for a full-fledged commercial application. For a commercial application, a more complete translation table may be required.

The translation table also need not be user-customizable as described. It may be a default translation table available from a manufacturer. Similarly, the GET CONFIRMATION step may be removed. The default translation table and removal of the GET CONFIRMATION step will however result in a less flexible implementation of the invention.

In the preferred embodiment, the search text is extracted from a selected text which serves as input to a search operation. The search text may however be developed in a similar manner as described for the other conditions using keywords.

I claim:

1. A method of retrieving data using a search command comprising the steps of:

receiving the search command;

breaking the search command into words;

translating any word which matches one of a plurality of predetermined keywords into an appropriate search condition using information which correspond to the matched one of a plurality of predetermined keywords;

identifying any word which does not match the plurality of predetermined keywords as a search text, wherein the search text includes a plurality of words which are used as a whole for searching; and retrieving any record from a data store which contains the search text and which meets any search conditions derived from the search command.

\* \* \* \* \*